UNITED STATES PATENT OFFICE.

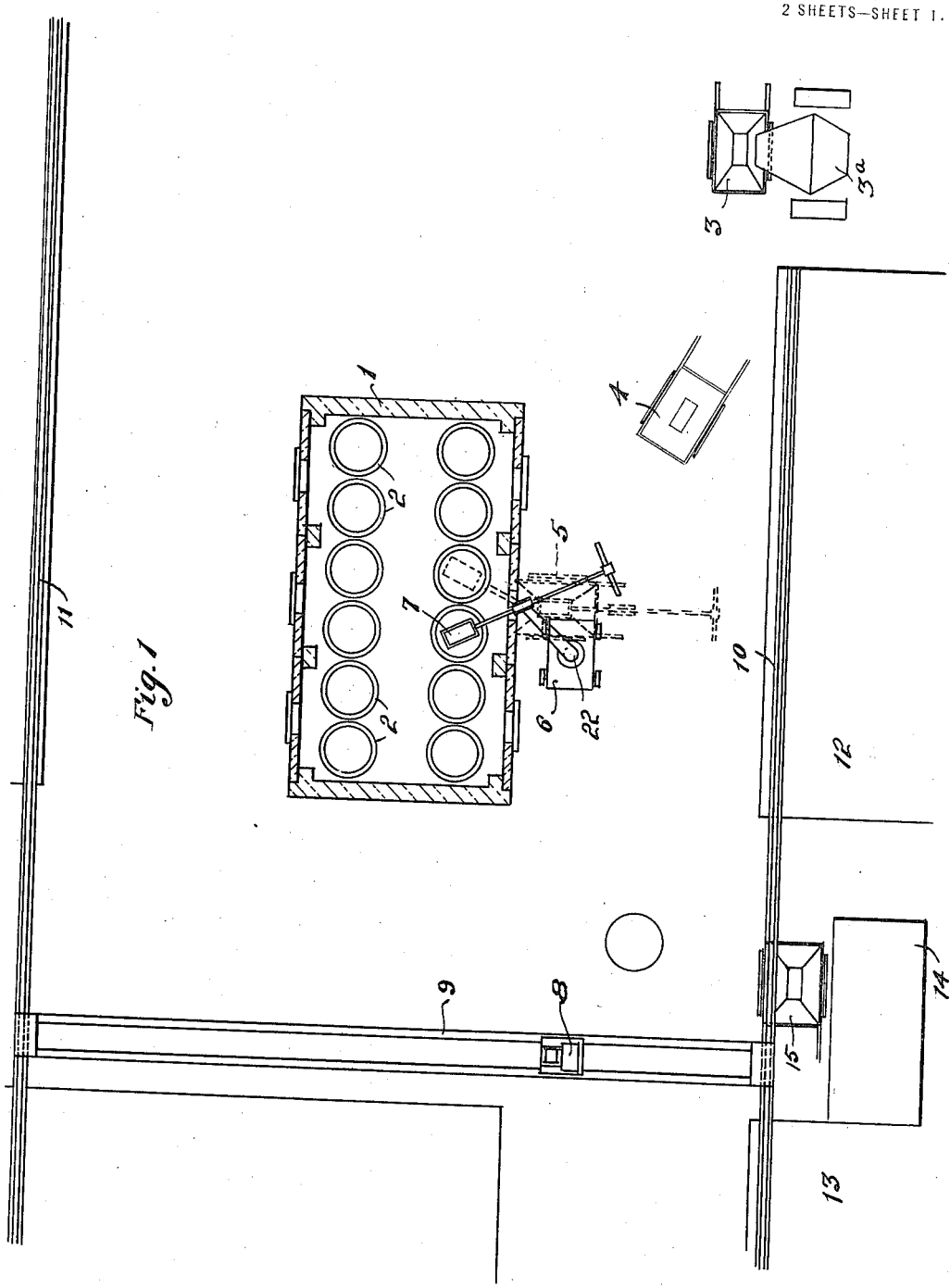

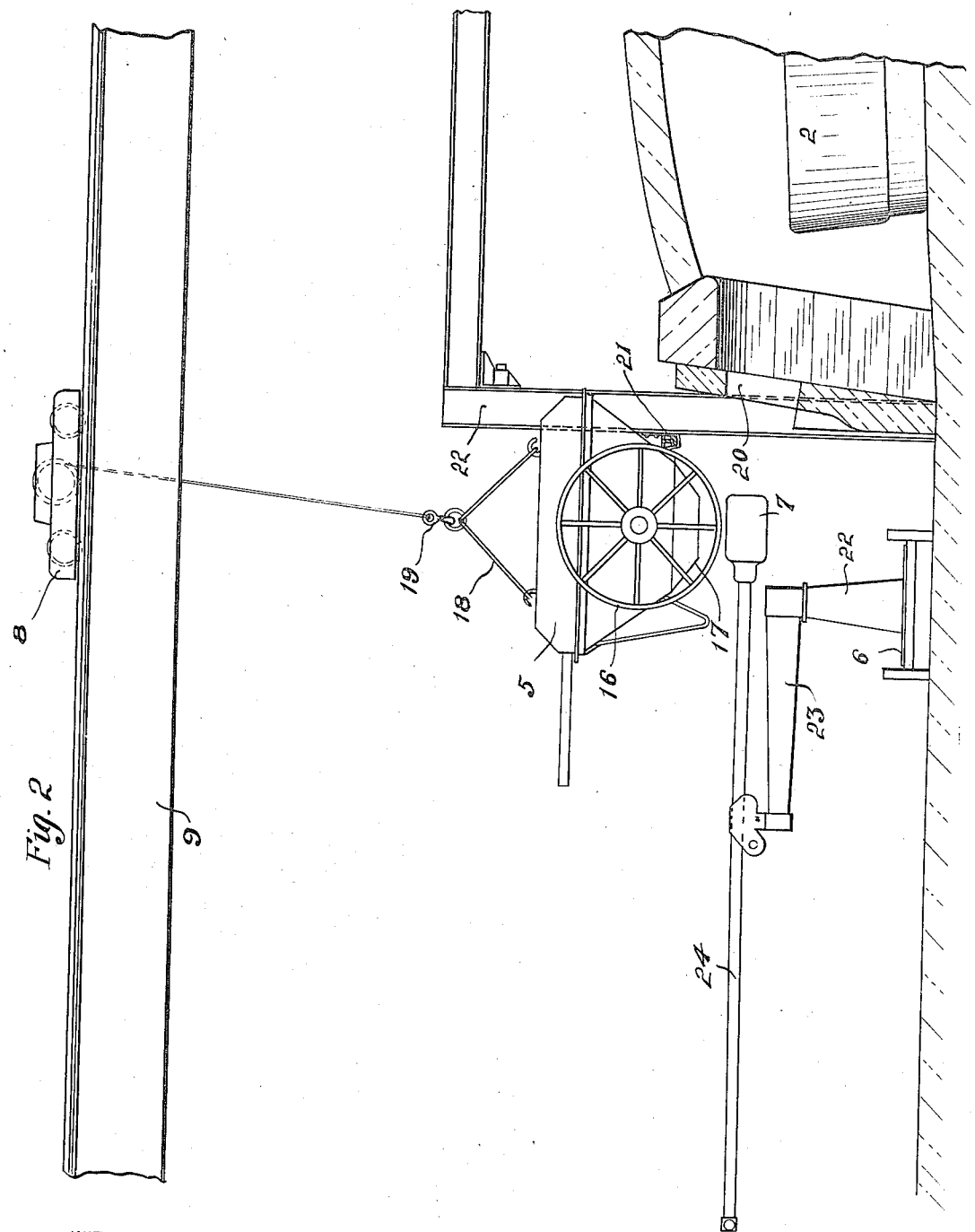

JOHN A. BECHTEL, OF TARENTUM, PENNSYLVANIA, ASSIGNOR TO PITTSBURGH PLATE GLASS COMPANY, A CORPORATION OF PENNSYLVANIA.

PROCESS OF HANDLING MATERIAL IN GLASS-MAKING. REISSUED 1,224,892.  Specification of Letters Patent.  Patented May 8, 1917.

Application filed July 8, 1913. Serial No. 777,860.

*To all whom it may concern:*

Be it known that I, JOHN A. BECHTEL, a citizen of the United States, residing at Tarentum, in the county of Allegheny and State of Pennsylvania, have invented a certain new and useful Process of Handling Material in Glass-Making, of which the following is a specification.

The invention relates to the art of handling the material employed in the making of glass, and particularly plate glass. Some of the primary objects of the invention are as follows: (1) the provision of a process in which the number of handlings (and the consequent tendency to unmix) of the mixed batch is reduced to a minimum; (2) the provision of a procedure wherein the number of workmen required for the attention of a furnace is reduced to a fraction of the number required in the process commonly used heretofore; (3) the provision of a process wherein the dust produced in the handling operations is much reduced in quantity, thus promoting the health and comfort of the operators and largely eliminating the clogging of the regenerator checkers and the fluxing of the bricks composing such checkers; (4) the provision of a process in which the amount of batch to each pot can be accurately adjusted to suit the requirements thereof; (5) the provision of a process in which the workmen are protected from the excessive heat condition heretofore incident to the charging of the pots, and in which the labor of the few workmen required is made comparatively light.

Apparatus capable of carrying out the process is shown in the accompanying drawings, wherein—

Figure 1 is a diagrammatic plan view showing the general arrangement of the apparatus employed, the furnace being shown in section to disclose its interior, Fig. 2 is an enlarged section through the furnace, on the line II—II of Fig. 1, and shows the filling apparatus in operative position. Another form of apparatus capable of carrying out the process is shown in my co-pending application, Serial No. 777,859.

Heretofore the most common procedure employed in supplying the batch to the pots in a glass melting furnace was to supply the mixed batch from a mixer to barrows or similar wheeled receptacles which were wheeled to positions adjacent the charging doors of the furnace, from which point the batch was transferred to the pots by means of hand ladles into which the batch from the barrows was shoveled. This procedure had certain disadvantages which may be briefly outlined as follows: (1) The supplying of the material into the barrows and the subsequent shoveling of it into the hand ladles involved two handlings of the batch, of a character which tended to cause more or less unmixing of the constituent materials. The materials thus supplied to the pot were not as thoroughly mixed as when they came from the mixer, and as a result the quality of the product was more or less affected.

(2) The shoveling of the batch into the handling ladles and its deposit in the pots produced a great amount of alkaline dust harmful and disagreeable to the operators, and in time filling and clogging the checkers of the furnace regenerators and causing a fluxing action in the bricks constituting the checkers. (3) The shoveling of the batch from the barrows into the hand ladles involved the spilling of a large amount of the batch on the floor, and when this material was gathered up and placed in the ladles it had always gathered up a certain amount of foreign material detrimental to the quality of the glass produced. (4) The number of workment required because of the character of the work, and the heat and dust conditions, were unduly large in proportion to the result achieved, and because of the unfavorable conditions under which the laborers had to work it was very difficult to secure men to handle the ladles and shovel the material from the barrows to the ladles. Because of the use of the relatively short ladles for placing the material in the pots, the workmen had to work relatively close to the open charging doors where the heat conditions are so severe that the work could be endured only in relatively short shifts, and then only at considerable risk. (5) Under the excessive heat conditions the operation of filling the pots could not be conducted with the care and accuracy required for the best results, and as a consequence the right amount of batch was not always deposited in the various pots, the various pots—depending upon their position in the furnace—requiring different quantities of batch for the various fills.

My invention was devised to overcome, and has overcome, all of the foregoing difficulties, and accomplishes the results as set forth in the statement of invention preceding, the number of men required in my process being reduced to a quarter of the number required by the old process, great accuracy in filling the pots being secured, and the work of getting the batch into the pots being changed from the most arduous in connection with glass making to the easiest, while the troubles incident to unmixing and formation of dust are eliminated.

In addition to the old handling feature as above outlined, a modified process has been used in a few instances. This modified procedure involved the use of hoppers of large capacity placed some forty or fifty feet removed from the furnace, such hoppers being filled with the mixed batch brought on cars from the mixing apparatus, and having gravity discharge passages. In using this apparatus the pots were taken from the furnace by means of cranes and carried to the hoppers where they were given the first fill. They were then returned to the furnaces, and the batch melted down in the usual way. The second and third fills of the pots was accomplished by means of barrows which were wheeled back and forth between the hoppers and the charging doors of the furnace, the procedure in so far as the second and third fills were concerned being as heretofore outlined in connection with the first process described. This process in so far as the second and third fills were concerned had all the disadvantages of the first process heretofore described, while as to the first fill accomplished by placing the pots under the hopper and transferring them to the furnace, there were certain other disadvantages. One of these consisted in the fact that the large quantity of material in the supply hoppers tended to unmix. Another disadvantage resided in the fact that the melting down of the first fill took a longer period than is the case where the pot is filled in small units as by a ladle, instead of being filled all at once. Where the pot is filled in small units each unit is separately exposed to the intense heat radiated from the crown of the furnace, so that each unit of batch receives a large amount of heat before the next unit of batch is applied. The removal of the pot and its filling all at one time therefore involved not only a great loss of heat due to opening up the furnace to remove the pot, but also put an excessive strain on the pot and resulted in a waste of time due to the fact that the melting operation after the pot was returned to the furnace was unduly long. My present process eliminates all the disadvantages incident to this last process.

Briefly stated, my present process comprehends the step of discharging the mixed batch directly from the mixer into a relatively small portable hopper, which hopper is adapted to discharge by gravity and is carried to a position against the furnace and just above the charging door. Successive increments of the batch are then discharged into a ladle mounted for movement from a position just beneath the discharge opening of the hopper to a position inside the furnace. There is thus no shoveling or rehandling of the mixture tending to unmix it, practically no dust incident to the handling of the mixture, and the manual operation is limited to the actuation of the door of the hopper and to the step of swinging the ladle into and out of the furnace, which step can be accomplished by an operator at a considerable distance removed from the charging door of the furnace.

Referring first to the general arrangement of parts as shown in the drawings; 1 is the glass melting regenerator furnace built in the usual way and containing a plurality of pots 2—2 for the melting of the batch for use in the manufacture of plate glass; 3ª is the batch mixer which may be of any form, but which as illustrated is of the rotary type; 3, 4, and 5 are all gravity discharge batch hoppers for receiving the batch from the mixer 3ª and conveying it to the furnace; 6 is a truck carrying a charging ladle 7; 8 is an overhead crane for handling the hoppers 3, 4, and 5, such crane being mounted for movement along the crane girder 9, and such girder in turn being mounted for movement along the rails 10 and 11; 12 and 13 are leers in which the glass is annealed after being cast; 14 is the table upon which the plates of glass from the leers 12 and 13 are trimmed, and 15 is a gravity discharge cullet hopper for receiving the waste portions of glass or cullet trimmed from the plates of glass, such cullet hopper hereinafter described being handled in somewhat the same way as the hoppers 3, 4, and 5, in the step of supplying the pots in the furnace with cullet.

As indicated in Fig. 2 the hoppers 3, 4, and 5 are provided with wheels 16, and with a swinging valve 17 which controls the gravity discharge from the hopper, such valve being operated manually in any desired way. The hopper is also provided with a bail 18 with which detachable engagement is made from the cable of the crane 8 by means of the hook 19. The hoppers 4 and 5 are successively brought beneath the discharge end of the mixer 3 (Fig. 3,) and after filling are wheeled to a position adjacent the furnace 1, after which one of the hoppers is raised to the position indicated in full lines in Fig. 2 and in dotted lines in Fig. 1. When in this position the discharge outlet of the hopper is preferably directly over one of the charging doors 20 of the furnace, although this position might be varied without seriously interfering with the operation. In order to steady the hopper in its suspended position it is brought against the rail 21 carried by the buck stays 22, the crane 8 being moved to the right sufficiently to cause the wheels of the hopper to bear forcibly against the rail 21.

As a convenient means for transferring the contents of the hoppers to the pots 2 in the furnace, the transfer mechanism carried by the truck 6 is employed. This mechanism comprises a post 22 upon the upper end of which is pivoted an arm 23. At the free end of the arm 23 is mounted the handle 24 of the ladle 25, such handle being pivoted for horizontal swinging movement, and being rotatable about its own axis in order to permit the dumping of the contents of the ladle after it has been positioned over one of the pots. The handle 24 is mounted in its support so that the ladle 7 cannot tilt below the vertical position indicated in Fig. 2. This is of advantage in that it relieves the operator of the strain of supporting the ladle 7 after it is filled, and guards against the accidental striking of the pot by the ladle. In operation the truck is preferably positioned as indicated in Fig. 1, with the post 22 to one side of the center line of the opening through which the charging is being carried on. With the post 22 in this position the ladle 7 is very conveniently oscillated between its position over the pot and its position under the discharge outlet of the hopper. One hopper preferably contains enough material to fill two pots, and the charging opening 20 is preferably arranged midway between the two pots. The ladle 7 constitutes a measuring increment feeder, its capacity being about one tenth that of the pots 2, so that in the first fill about ten charges from the ladles are required in order to fill a pot. The various pots in the furnace require different quantities of batch, depending upon their location, and the ladle 7 having a relatively small capacity constitutes an accurate measuring device for supplying these pots with precisely the quantity of batch required. After a hopper has been emptied it is lowered to the floor and wheeled back to the mixer 3 for refilling. By using a plurality of hoppers, a filled hopper is always available for use when the hopper supported by the crane is emptied.

The cullet hopper 15 (Fig. 1) is of the same general construction as the hoppers 3, 4, and 5, but has a different valve at the bottom, in order to permit of the discharge of cullet which is not as readily discharged as the batch. When being filled the cullet hopper occupies a position adjacent the sheet of glass which is being trimmed, and the waste particles are thrown into the hopper as fast as they are detached from the main sheets. The hopper is then moved to a position adjacent the furnace and handled by the crane as heretofore described in connection with the batch, the cullet being employed for the first fill of new pots, or in connection with the batch under the same conditions as those in which cullet is customarily used in the art. As the cullet is directly supplied to the hopper from the tables on which the glass is trimmed, the labor of rehandling, such as occurs when the cullet is thrown into a pile and subsequently shoveled into a collecting receptacle is avoided. By using the gravity discharge hopper for the cullet the labor of shoveling the cullet from a collecting receptacle to the charging ladle as has heretofore been the practice is also avoided. If desired, the cullet hopper might be carried from the position indicated in Fig. 1 to its charging position by the crane, but the preferred procedure is to wheel the hopper to a position adjacent the furnace and then utilize the crane for the charging operation only.

The advantage of my procedure, as compared with the old processes as heretofore described, in so far as the handling of the mixed batch is concerned will be readily apparent. The process involves a minimum amount of rehandling and consequent unmixing of the batch. The gravity transfer of the batch from the hopper to the ladle has little tendency to unmix the materials as is the case with the shoveling of the prior art, so that the materials are supplied to the pots in a perfect mixture. The discharge opening from the hopper is relatively close the ladle 7, and there is little agitation in the discharging operation, so that the amount of dust raised is very slight, as compared with old process wherein a cloud of dust was raised by the shoveling operation. The procedure is such that the operators are at a distance considerably removed from the open charging doors, the handle 24 being made as long as is necessary in order to secure this result. Furthermore the exertion as compared with the shoveling operations of the old art is slight, as the arm 23 carrying the handle of the ladle is easily swung, and the handle 24 is readily rotated about its axis in order to dump the contents into the pot. The ladle 7 can be uniformly filled so that an accurate measuring of the bath supplied to the pot is secured, and the workman is so far removed from proximity to the charging door that he is able to conduct the filling operation without undue haste, and consequently with the degree of care necessary for an accurate measuring operation. And finally, the amount of manual labor is so reduced that only a fraction of the number of men is required as compared with that necessary in the old processes. For the handling of a furnace of ordinary size such as that indicated in Fig. 1 three men only are required—one for operating the crane and valve, and two for the manipulation of the handle 24, such handle being operated by two men working one at a time and relieving each other, or by two men working together all of the time. For the same furnace using the old process twelve men were required, so that the number of workmen required is reduced seventy-five per cent.

What I claim is:

1. In a glass plant, in combination with a batch mixer and a glass melting furnace having charging openings through its side and provided with melting pots, a wheeled truck adapted to receive batch from the mixer and movable along the floor of the plant from the mixer to a position adjacent the furnace, the said truck being provided with a gravity discharge passage and a valve or gate controlling said passage, an elevating device for engaging the truck and carrying it to a position over one of the charging openings of the furnace, and a ladle independent of the truck supported for movement from a receiving point beneath the discharge passage of the truck through the charging opening to a discharge position in the furnace.

2. In a glass plant, in combination with a glass melting furnace having charging openings through its side and provided with melting pots, a portable hopper adapted to receive glass making materials for the pots and transport it to a position adjacent the furnace, an elevating device for engaging the hopper and carrying it to a position above one of the charging openings of the furnace, the said hopper having a gravity discharge passage from its lower portion provided with a gate or valve, a ladle support independent of the hopper and mounted for movement longitudinally of the furnace, and a ladle mounted for movement on said ladle support and movable from a receiving position beneath the discharge passage of the hopper through the charging opening to a discharge position in the furnace.

In testimony whereof I have hereunto signed my name in the presence of the two subscribed witnesses.

JOHN H. BECHTEL.

Witnesses:
ARCHWORTH MARTIN,
LETITIA A. MYERS.